United States Patent
Li (10) Patent No.: US 6,480,843 B2
(45) Date of Patent: Nov. 12, 2002

(54) SUPPORTING WEB-QUERY EXPANSION EFFICIENTLY USING MULTI-GRANULARITY INDEXING AND QUERY PROCESSING

(75) Inventor: Wen-Syan Li, Fremont, CA (US)

(73) Assignee: NEC USA, Inc., Princeton, NJ (US)

( * ) Notice: Subject to any disclaimer, the term of this patent is extended or adjusted under 35 U.S.C. 154(b) by 2 days.

(21) Appl. No.: 09/185,323

(22) Filed: Nov. 3, 1998

(65) Prior Publication Data

US 2002/0059161 A1 May 16, 2002

(51) Int. Cl.⁷ .............................. G06F 17/30; G06F 7/00
(52) U.S. Cl. .................................. 707/5; 707/10; 704/7
(58) Field of Search ................................. 707/1–6, 532; 704/7

(56) References Cited

U.S. PATENT DOCUMENTS

| | | | | |
|---|---|---|---|---|
| 5,278,980 A | * | 1/1994 | Pedersen et al. | 707/4 |
| 5,325,298 A | * | 6/1994 | Gallant | 704/9 |
| 5,576,954 A | * | 11/1996 | Driscoll | 707/3 |
| 5,675,819 A | * | 10/1997 | Schuetze | 704/10 |
| 5,724,571 A | | 3/1998 | Woods | 395/605 |
| 5,794,178 A | * | 8/1998 | Caid et al. | 704/9 |
| 5,819,258 A | * | 10/1998 | Vaithyanathan et al. | 707/2 |
| 5,930,783 A | * | 7/1999 | Li et al. | 707/1 |
| 6,038,560 A | * | 3/2000 | Wical | 707/5 |
| 6,088,692 A | * | 7/2000 | Driscoll | 707/5 |
| 6,101,492 A | * | 8/2000 | Jacquemin et al. | 707/3 |
| 6,175,829 B1 | * | 1/2001 | Li et al. | 707/3 |

OTHER PUBLICATIONS

Hearst, M.A. and Karadi, C. "Cat–a–Cone: An Interactive Interface for Specifying Searches and Viewing Retrieval Results using a Large Category Hierarchy", Proc. of the 20th Int'l ACM SIGIR Conf. on R&D in Information Retrieval, Jul. 27–31, 1997 pp. 246–255.*

Ruge, G. "Human Memory Models and Term Association", Proceedings of the 18th Annual International ACM SIGIR Conference on R&D in Information Retrieval, Jul. 9–13, 1995, pp. 219–227.*

(List continued on next page.)

Primary Examiner—Jean R. Homere
Assistant Examiner—Luke S Wassum
(74) Attorney, Agent, or Firm—Sughrue Mion, PLLC (57) ABSTRACT

A method and apparatus for efficient query expansion using reduced size indices and for progressive query processing. Queries are expanded conceptually, using semantically similar and syntactically related words to those specified by the user in the query to reduce the chances of missing relevant documents. The notion of a multi-granularity information and processing structure is used to support efficient query expansion, which involves an indexing phase, a query processing and a ranking phase. In the indexing phase, semantically similar words are grouped into a concept which results in a substantial index size reduction due to the coarser granularity of semantic concepts. During query processing, the words in a query are mapped into their corresponding semantic concepts and syntactic extensions, resulting in a logical expansion of the original query. Additionally, the processing overhead is avoided. The initial query words can then be used to rank the documents in the answer set on the basis of exact, semantic and syntactic matches and also to perform progressive query processing.

50 Claims, 6 Drawing Sheets

OTHER PUBLICATIONS

Crouch, C.J., and Yang, B. "Experiments in Automatic Statistical Thesaurus Construction", Proceedings of the 15th Annual International ACM SIGIR Conference on R&D in Information Retrieval, Jun. 21–24, 1992, pp. 77–88.*

Crouch, C.J. "An Approach to the Automatic Construction of Global Thesauri", Information Processing and Management, vol. 26, No. 5, 1990, pp. 629–640.*

Crouch, C.J. "A Cluster–Based Approach to Thesaurus Construction", Proceedings of the 11th Annual International Conference on R&D in Information Retrieval, Jun. 13–15, 1988, pp. 309–320.*

Grefenstette, G. "Use of Syntactic Context to Produce Term Association Lists for Text Retrieval", Proceedings of the $15^{th}$ Annual International ACM SIGIR Conference, Jun. 1992.*

Voorhees, E. "Query Expansion using Lexical–Semantic Relations", Proceedings of the $17^{th}$ Annual ACM Conference on Research and Development in Information Retrieval, Aug. 1994, pp. 61–69.*

M.W. Berry et al., "Computational Methods for Intelligent Information Access," Proceedings of the 1995 ACM Conference on Supercomputing, 1995.

C. Buckley et al., "Automatic Query Expansion Using SMART," Proceedings of the $3^{rd}$ Text Retrieval Conference, Gaithersburg, Maryland, 1993.

J. Callan et al., "Trec and Tipster Experiments With Inquery," Information Processing and Management, 31:327–337, 1995.

W.B. Croft et al., "Providing Government Information on the Internet: Experiences with THOMAS," Proceedings of Digital Libraries (DL '95), 1995.

W.B. Croft et al., "Corpus–Specific Stemming Using Word Form Co–occurrence," Proceedings of the Fourth Annual Symposium, 1994.

G. Grefenstette, "Use of syntactic context to produce term association lists for text retrieval," Proceedings of the Fifteenth Annual International ACM SIGIR Conference, Denmark, 1992.

R. Harshman et al., "Indexing by latent semantic analysis," Journal of the American Society of Information Science, 41:391–407, 1990.

C. Jacquemin, "Guessing Morphology from Terms and Corpora," Proceedings of the $20^{th}$ Annual International ACM SIGIR Conference, Philadelphia, PA, USA, 1997.

O. Kwon et al., "Query Expansion Using Domain Adapted, Weighted Thesaurus in an Extended Boolean Model," Proceedings of the $3^{rd}$ International Conference on Information and Knowledge Management, pp. 140–146, 1994.

W. Li et al., "Facilitating Multimedia Database Exploration through Visual Interfaces and Perpetual Query Reformulations," Proceedings of the $28^{th}$ International Conference on Very Large Data Bases, pp. 538–547, Athens, Greece, Aug., 1997.

W. Li et al., "WebDB: A Web Query System and its Modeling, Language and Implementation," Proceedings of the 1998 IEEE Advances in Digital Libraries Conference, Santa Barbara, CA, USA, Apr., 1998.

G.A. Miller, "Nouns in WordNet: A Lexical Inheritance System", In International Journal of Lexicography 3 (4), pp. 245–264, 1990.

Y. Qiu et al., "Concept Based Query Expansion," Proceedings of the $16^{th}$ Annual International ACM SIGIR Conference, Pittsburgh, PA, USA, 1993.

G.G. Robertson et al., "Information Visualization Using 3D Interactive Animation" Communications of the ACM, vol. 36, No. 4, pp. 57–71, Apr., 1993.

G. Salton et al., "Improving Retrieval Performance by Relevance Feedback," Journal of the American Society for Information Science, 41(4):288–297, Jun., 1990.

G. Salton et al., "The SMART and SIRE Experimental Retrieval Systems," McGraw–Hill, New York, pp. 118–155, 1983.

E. Voorhees, "Query Expansion Using Lexical–Semantic Relations," Proceedings of the $17^{th}$ Annual International ACM SIGIR Conference, Dublin, Ireland, 1994.

J. Xu et al., "Query Expansion Using Local and Global Document Analysis," Proceedings of the $19^{th}$ Annual International ACM SIGIR Conference, Zurich, Switzerland, 1996.

* cited by examiner

FIG. 1

| Doc# | Word_list |
|---|---|
| Doc1 | Ford, Showroom |
| Doc2 | Auto, SalesOffice |
| Doc3 | Car, Dealer |
| Doc4 | Auto, Dealer |
| ⋮ | ⋮ |

FIG. 2A

| Word# | Doc_list |
|---|---|
| Ford | Doc1 |
| Showroom | Doc1 |
| Auto | Doc2, Doc4 |
| Dealer | Doc3, Doc4 |
| ⋮ | ⋮ |

FIG. 2B

| Concept# | Sem_word_list |
|---|---|
| Sem1 | Car, Auto, Automobile, Sedan |
| Sem2 | Dealer, Showroom, SalesOffice |
| Sem2 | Garage, Parking |
| ⋮ | ⋮ |

FIG. 3A

| Syn# | Syn_word_list |
|---|---|
| Syn1 | Buick, Car |
| Syn2 | Car, Garage |
| Syn3 | Auto, Garage |
| Syn4 | Ford, Car |
| Syn5 | Ford, Auto |
| ⋮ | ⋮ |

FIG. 3B

| Doc# | Concept#_PN_list |
|------|------------------|
| Doc1 | Ford, Sem2 |
| Doc2 | Sem1, Sem2 |
| Doc3 | Sem1, Sem2 |
| Doc4 | Sem1, Sem2 |
| ⋮ | ⋮ |

FIG. 4A

| Concept# | Sem_doc_list |
|----------|--------------|
| Sem1 | Doc2, Doc3, Doc4 |
| Sem2 | Doc1, doc2, Doc3, Doc4 |
| ⋮ | ⋮ |

FIG. 4B

| Coocc# | Syn_word_list |
|--------|---------------|
| Syn1' | Buick, Sem1 |
| Syn2' | Sem1, Sem3 |
| Syn3' | Ford, Sem1 |
| Syn4' | Sem7, Sem21 |
| Syn5' | Ford, Buick |
| ⋮ | ⋮ |

FIG. 4C

Many to 1
$W_{x,1} - W_y$
$W_{x,2} - W_y$
$W_{x,3} - W_y$    1 to 1
$W_{x,4} - W_y$ → $Sem\ m - W_y$
⋮
$W_{x,n} - W_y$

FIG. 5A

1 to Many
$W_y - W_{x,1}$
$W_y - W_{x,2}$
$W_y - W_{x,3}$    1 to 1
$W_y - W_{x,4}$ → $W_y - Sem\ m$
⋮
$W_y - W_{x,n}$

FIG. 5B

Many to Many
$W_{x,1} - W_{y,1}$
$W_{x,2} - W_{y,2}$
$W_{x,3} - W_{y,3}$    1 to 1
$W_{x,4} - W_{y,4}$ → $Sem\ m - Sem\ p$
⋮
$W_{x,n} - W_{y,n}$

Legends: E: Exact Match
Se: Semantic Relaxation
Sy: Syntactic Relaxation
X: Do Not Match

SUPPORTING WEB-QUERY EXPANSION EFFICIENTLY USING MULTI-GRANULARITY INDEXING AND QUERY PROCESSING

BACKGROUND OF THE INVENTION

1. Field of the Invention

This invention relates generally to field of indices and queries applied to a collection of documents in a database. More specifically, this invention relates to efficient expansion and processing of the queries, to reducing the size of indices used to perform the query expansion and to progressive query processing.

2. Description of the Related Art

Conventional retrieval systems, by which documents may be retrieved through the application of queries, are based on a common set of principles and methodologies of categorizing documents. Documents are normally indexed manually by subject experts or librarians using pre-specified and controlled vocabularies. Alternatively, documents can be indexed based on the words included in the documents. Users can search documents using terms from the accepted vocabularies, together with appropriate boolean operators between them. In this type of system, an exact match strategy is used. Although this approach has many advantages, such as simplicity and high precision, it suffers from the problem of word mismatch.

Figure 1:
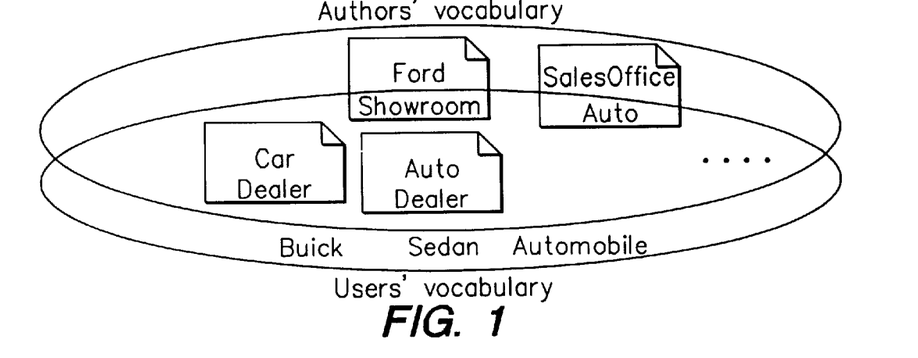
FIG. 1 illustrates the problem of word mismatch in the context of information retrieval.

The problem of word mismatch in information retrieval occurs because people often use different words to describe concepts in their queries than authors use to describe the same concepts in their documents. FIG. 1 shows that words used in HyperText Markup Language (HTML) documents related to the words "car" and "dealer" may vary from one document to another. Languages other than HTML, such as Extensible Markup Language (XML) and Standard Generalized Markup Language (SGML), may be used. If a user uses a query with the words "automobile" and "dealer," he or she cannot retrieve all the relevant documents due to word mismatch problems.

Query expansion has been suggested as a technique for dealing with this problem. Such an approach would expand queries using semantically similar words (e.g. synonyms or other semantically related words) and syntactically related words (e.g. words co-occurring in the same document above a certain frequency are syntactically co-occurring words) to those words in the query to increase the chances of matching words in relevant documents. When query expansion is used, the "car dealer" query is expanded as follows to include terms with similar meanings:

Line 1. [("car" OR "automobile" OR "auto" OR "sedan" ) OR

Line 2. ("Ford" OR "Buick")] AND

Line 3. ("Dealer" OR "Showroom" OR "SalesOffice")

There are two types of query expansion involved in this example. The query expansions in Line 1 and Line 3 are adding additional words related to car and dealer by lexical semantics, i.e. words which are semantically similar. Automobile, auto, and sedan are words having a similar meaning to the word car. Similarly, Showroom and SalesOffice have meanings similar to the word dealer. The other type of query expansion, shown in Line 2, is by, for example, syntactical co-occurrence relationships. A large number of the words used on the World Wide Web ("the Web") are actually proper names, which cannot be found in lexical dictionaries. Examples of proper names include Ford, Buick, NBA, and National Football League. As noted above, syntactical co-occurrence relationships are derived from analysis on the frequency of two words co-occurring in the same document. This is based on the assumption that there is a higher chance that two words are related if they appear frequently together in the same document. For example, the co-occurring words with Ford could be dealer, body shop, Mustang, Escort, etc.

To support query expansion, indices of words related by lexical semantics and syntactical relationships, such as co-occurrence, need to be maintained. The indices for related words by lexical semantics can be constructed as a hierarchical structure (see e.g. W. Li et al., "Facilitating Multimedia Database Exploration through Visual Interfaces and Perpetual Query Reformulations," Proceedings of the 23rd International Conference on Very Large Data Bases, pages 538–547, Athens, Greece, August 1997), a semantics network (see e.g. G. A. Miller, "Nouns in WordNet: A Lexical Inheritance System" In International Journal of Lexicography 3 (4), 1990, pages 245–264), or hierarchical clusters of associated words (see e.g. G. Salton et al., "The SMART and SIRE Experimental Retrieval Systems," pages 118–155, McGraw-Hill, New York, 1983). Since syntactical relationships, such as syntactical co-occurrence relationships, are binary, the size of syntactical relationship indices can be extremely large. Some techniques have been proposed for stemming. See e.g., G. Grefenstette, "Use of syntactic context to produce term association lists for text retrieval," Proceedings of the Fifteenth Annual International ACM SIGIR Conference, Denmark, 1992; J. Xu et al., "Query Expansion Using Local and Global Document Analysis," Proceedings of the 19th Annual International ACM SIGIR Conference, Zurich, Switzerland, 1996; and C. Jacquemin, "Guessing Morphology from Terms and Corpora," Proceedings of the 20th Annual International ACM SIGIR Conference, Philadelphia, Pa., USA, 1997. Such techniques include analysis of occurrence frequency, and employing morphological rules (e.g. converting all words to root form) or lexical dictionaries. However, the size of indices for words associated by syntactical co-occurrence relationships is too large to search efficiently.

A substantial amount of work on the problem of word mismatch has been done in the area of information retrieval (IR). See e.g. G. Salton et al., "Introduction to Modern Information Retrieval," McGraw-Hill Book Company, 1983; G. Salton, "Automatic Text Processing: The Transformation, Analysis, and Retrieval of Information by Computer," Addison-Wesley Publishing Company, Inc., 1989; and K. Sparck Jones et al., "Readings in Information Retrieval" Morgan Kaufmann, San Francisco, Calif., USA, 1997. However, much of the work has been directed to the study of retrieval measures such as recall and precision. Although some work has suggested ways to efficiently support query expansion (see e.g. C. Buckley et al., "Automatic Query Expansion Using SMART," Proceedings of the 3rd Text Retrieval Conference, Gaithersburg, Md., 1993) and indexing mechanisms, two problems have persisted without an acceptable solution. First, index size is extremely large since many words in a document collection (e.g. the Web) are distinct proper names and each word has a number of semantically similar and syntactically related words. Second, query processing is expensive since queries are expanded by adding additional words.

These problems get worse when dealing with document information collected from the Web since the number of documents is very large and the words used are extremely diverse, inconsistent, and sometimes incorrect (e.g., typographical errors). A study has shown that most user queries on the Web typically involve two words. See B. Croft et al., "Providing Government Information on the Internet: Experiences with THOMAS," Proceedings of Digital Libraries (DL '95), 1995. However, with query expansion, query lengths increase substantially. As a result, most existing search engines on the Web do not provide query expansion functionality.

An overview of existing work in the area of query expansion will now be presented. Query expansion has received a significant attention in the field of IR. However, the focus in the past has been to evaluate the improvements in retrieval measures, i.e., precision and recall, as a result of query expansion. Another research focus has been in the direction of building dictionaries so as to identify a set of similar terms for a given query word. However, the existing work has done little to address the problem of efficient processing of queries when they undergo query expansion or to reduce the size of the indices used to perform query expansion and processing. Furthermore, the issue of ranking documents on the basis of exact and similarity matches remains a difficult problem.

SMART is one of the best known advanced information retrieval systems. See R. T. Dattola, "Experiments with a fast algorithm for automatic classification," Gerard Salton, editor, The SMART Retrieval System - Experiments in Automatic Document Processing, chapter 12, Prentice-Hall, Inc., Englewood Cliffs, N.J., 1971; and G. Salton et al., "The SMART and SIRE Experimental Retrieval Systems," supra. In SMART, each document is represented by a vector of terms. Each position of the vector represents the weight (i.e. importance) of corresponding terms in the document. For a document collection of M documents with N distinct terms, the collection is represented as an M ×N matrix. A query is also represented as a vector of terms. The document retrieval is based on similarity computation of the cosine measure of the query vector and each document vector. Other well known systems include INQUERY. See J. Callan et al., "Trec and tipster experiments with inquery," Information Processing and Management, 31:327–332, 1995.

Latent Semantic Indexing (LSI) is a technique which relies on statistically derived conceptual indices instead of individual term retrieval in lexical matching. See R. Harshman et al., "Indexing by latent semantic analysis," Journal of the American Society of Information Science, 41:391–407, 1990; and M. W. Berry et al., "Computational Methods for Intelligent Information Access," Proceedings of the 1995 ACM Conference on Supercomputing, 1995. LSI assumes that there is some hidden or latent structure in word usage, which needs to be externalized by analyzing the word occurrence in a document. Hence, documents are viewed as vectors in a very high dimensional term space and the individual elements in the vector represent the frequency of occurrence of a particular term in a given document. More sophisticated measures based on both global and local weightings can also be used. A truncated singular value decomposition (SVD) is used to estimate the structure in word usage across documents. See G. Golub et al., "Matrix Computations," Johns-Hopkins, Baltimore, Second Edition, 1989. Retrieval is then performed using the database of singular values and vectors obtained from the truncated SVD. Preliminary evaluation of LSI indicates that this approach of information retrieval is a more robust measure than that based on individual terms.

Automated query expansion has long been suggested as a technique for dealing with the word mismatch issue. See e.g., E. Voorhees, "Query Expansion Using Lexical-Semantic Relations," Proceedings of the 17th Annual International ACM SIGIR Conference, Dublin, Ireland, 1994. One approach uses a thesaurus to expand the query to increase the chances of matching words in relevant documents. A study has shown that simply using a general thesaurus provides limited improvement. Id. Many advanced techniques have also been proposed. See e.g., O. Kwon et al., "Query Expansion Using Domain Adapted, Weighted Thesaurus in an Extended Boolean Model," Proceedings of the 3rd International Conference on Information and Knowledge Management, 1994; Y. Qui et al., "Concept Based Query Expansion," Proceedings of the 16th Annual International ACM SIGIR Conference, Pittsburgh, Pa., USA, 1993; E. Voorhees, "Query Expansion Using Lexical-Semantic Relations," supra; and M. W. Berry et al., "Computational Methods for Intelligent Information Access," supra. Based on the experimental results, automatic query expansion, on average, improve effectiveness of retrieval by 7% to 25%. See C. Buckley et al., "Automatic Query Expansion Using SMART," supra.

Alternatively, improvements can be made by including syntactically relevant words. This approach is to cluster words based on co-occurrence in documents and to use these clusters to expand queries. Since the co-occurrence is a binary relationship, the size of such index is usually extremely large. One group has proposed a technique for using corpus-based word variant co-occurrence statistics to modify or create a stemmer and has demonstrated its advantage over the approach of using only morphological rules. See W. B. Croft et al., "Corpus-Specific Stemming Using Word Form Co-occurrence," Proceedings of the Fourth Annual Symposium, 1994. The above techniques that expand a query term to a set of semantically related terms are called global analysis. In query expansion, terms from relevance feedback can also be added to the subsequent query to improve the effectiveness of retrieval. See G. Salton et al., "Improving retrieval performance by relevance feedback," Journal of the American Society for Information Science, 41(4):288–297, June 1990. This is called local analysis. A formal study has shown that using global analysis techniques, such as word context and phrase structure, on the local set of documents produces results that are both more effective and more predictable than simple local feedback. See J. Xu et al., "Query Expansion Using Local and Global Document Analysis," supra. Each of the references discussed herein, is hereby incorporated by reference.

However, as noted above, the past work has failed to address the problem of efficient processing of queries when they undergo query expansion or of reducing the size of the indices used to perform query expansion and processing.

SUMMARY OF THE INVENTION

The present invention provides a solution to the problem of word mismatch and resulting inefficient query processing via a method and apparatus for efficient query expansion using reduced size indices and for progressive query processing. More specifically, queries are expanded conceptually, rather than physically, using semantically similar and syntactically related words to those specified by the user in the query to reduce the chances of missing relevant documents. To support query expansion, indices on words related by lexical semantics and syntactical co-occurrence need to be maintained. Two issues become paramount in supporting such query expansion: the size of index tables and the query processing overhead. In accordance with the present invention, the notion of a multi-granularity information and processing structure is used to support efficient query expansion, which involves an indexing phase, a query processing and a ranking phase. In the indexing phase, semantically similar words are grouped into a concept which results in a substantial index size reduction due to the coarser granularity of semantic concepts. During query processing, the words in a query are mapped into their corresponding semantic concepts and syntactic extensions, using a dictionary and actual data contents, resulting in a logical expansion of the original query. Additionally, the processing overhead can be avoided. The initial query words can then be used to rank the documents in the answer set on the basis of exact, semantic and syntactic matches and can also be used to perform progressive query processing.

BRIEF DESCRIPTION OF THE DRAWINGS

The above objects and advantages of the present invention will become more apparent by describing in detail preferred embodiments thereof with reference to the attached drawings in which.

DETAILED DESCRIPTION OF A PREFERRED EMBODIMENT

A preferred embodiment of a method and apparatus for efficient query expansion is described below in detail with reference to the accompanying drawings. It is to be noted that while the following discussion is presented in the context of the NEC PERCIO Object Oriented Database Management System (OODBMS), the present invention is not so limited. The present invention may be applied to a variety of database systems and document collections.

The present invention provides efficient indexing and processing support for query expansion by applying a concept of multi-granularity. The present approach takes the indices for semantically similar and syntactically related words after word stemming using available techniques, (see e.g., J. Xu et al., "Query Expansion Using Local and Global Document Analysis," Proceedings of the 19th Annual International ACM SIGIR Conference, Zurich, Switzerland, 1996; and C. Jacquemin, "Guessing Morphology from Terms and Corpora," Proceedings of the 20th Annual International ACM SIGIR Conference, Philadelphia, Pa., USA, 1997), and further reduces the index size by merging some entries (tuples) to an entry at a higher level of granularity. During query processing the tuples with information at a higher level of granularity are used to retrieve relevant documents. The original words of the query, at a finer granularity, can then be used to rank the documents in the answer set retrieved during query processing on the basis of exact, semantic, and syntactic similarity matches. By using multi-granularity indexing and query processing techniques, the advantages of smaller index size and faster query processing time are gained while preserving the overall precision of the retrieval mechanism.

Initially, the notion of multi-granularity will be discussed, as well as how it can be adapted in conjunction with the traditional indexing employed by most TR systems. Then, the storage overhead of multi-granularity indexing for a given document collection will be evaluated.

Figure 2A:
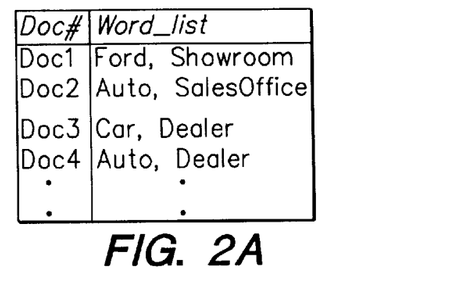
FIG. 2 illustrates an example of indices which are traditionally used in exact match information retrieval systems.
Figure 2B:
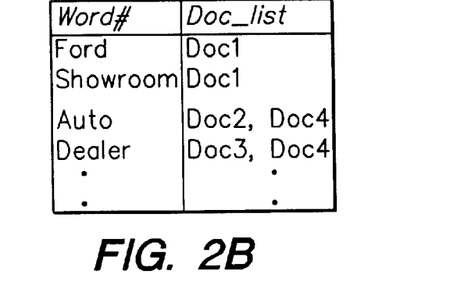

Traditional IR systems maintain indices to facilitate the retrieval of a list of documents for a given word as well as to extract a set of words associated with a given document. It is to be noted that in the present context, the term document may refer to text, images or a combination of text and images. The indices are illustrated in FIG. 2. Note that the table in FIG. 2(b) is an inverted index of the table in FIG. 2(a). In FIG. 2, the indices are shown as tables for ease of explanation. In actual implementation, classes on top of the NEC PERCIO OODBMS may be used, for example. Taking a sample query, if a user initiates a query with the words "car" and "dealer" the IR system fetches the list of documents from the corresponding rows in FIG. 2(b). The intersection of the document lists from the two rows forms the answer to the query. Clearly, this approach to IR supports only exact matches and will fail to retrieve relevant documents containing terms with similar meanings such as "automobile dealer""car showroom" or "automobile showroom" Query expansion can be used in conjunction with a special utility to expand the query from "car" and "dealer" to ("car" or "automobile"and ("dealer" or "showroom". Although this approach is feasible, it results in introducing significant query processing overhead. In particular, instead of two lookups of the index table in FIG. 2(b), several lookups are needed for each word semantically similar to that in the original query. Also, a thesaurus like facility such as an on-line dictionary is needed to expand the query terms to their semantically similar counterparts. These observations have led to the development, in accordance with the present invention, of a more efficient scheme to support query expansion in querying document collections.

Figure 3A:
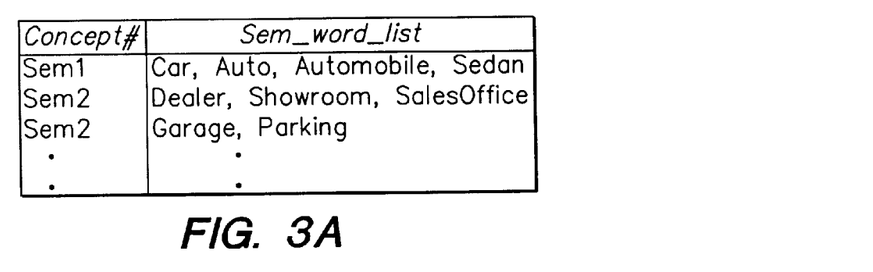
FIG. 3 illustrates an example of indices derived by grouping words into semantically similar concepts and syntactically related extensions for use in traditional information retrieval systems.
Figure 3B:
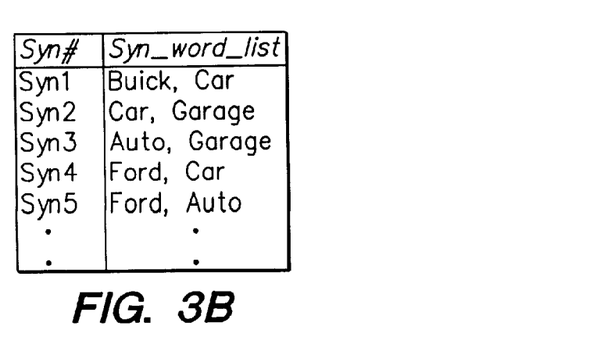

As discussed earlier, in order to avoid mismatch between user and author vocabularies, query expansion based on expanding query words on semantic similarity and syntactic relationships are needed. FIG. 3 illustrates the additional data-structures that are needed to facilitate query expansion in traditional IR systems. In particular, FIG. 3 is a table derived from a lexical-semantic on-line dictionary where words are grouped into semantically similar concepts. The table shown in FIG. 3 is simplified for ease of exposition. For example, the set of similar terms "car", "auto" "automobile" and "sedan" is represented as a symbolic entity sem1. Unlike for semantic similarity, which is based on a dictionary or a thesaurus, syntactic relationships in IR are determined from the document collection itself. In particular, word co-occurrence information can be used to relate two words syntactically. FIG. 3(b) illustrates the index that captures this information. By using, the traditional IR indices of FIG. 2 in conjunction with the auxiliary indices of FIG. 3, a rudimentary query expansion scheme can be supported in an IR system. Basically, given a user query, the query word list is expanded to include words that are both semantically similar as well as syntactically related.

Although the set-up discussed above can be used for processing queries with query expansion, this approach results in a high processing overhead. In accordance with the present invention, additional index structures that would allow the queries to be processed more efficiently are employed. The basic idea of the present approach is to transform the indices in FIGS. 2 and 3 so that queries can be expanded conceptually. That is, instead of expanding the query word list physically by including in the list semantically similar and syntactically related words, the query is expanded conceptually by replacing the query words by their corresponding higher level semantic concept and syntactic relationship (e.g. co-occurrence). This results in additional storage overhead due to the additional index structures. However, savings are realized since user queries can be processed more efficiently.

Figure 4A:
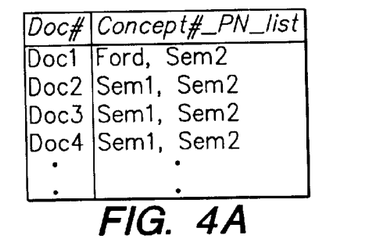
FIG. 4 illustrates the index structures required for more efficient query processing in accordance with the present invention.
Figure 4B:
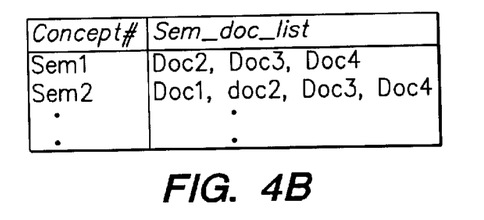

In order to process the expanded queries as described above, the index tables are modified as shown in FIG. 4. In particular, the index table in FIG. 4(a) is derived from FIG. 2(a) by replacing each word (which is not a proper noun) by its higher level semantic concept. The index table FIG. 4(b) is obtained by combining the words in FIG. 2(b) into their corresponding higher level semantic concept and merging the respective document list entries. Thus, the row entries corresponding to "car", "auto", "automobile", and "sedan" appear as a single entry Sem1 in FIG. 4(b). Similarly, the rows corresponding to "dealer", "showroom", and "SalesOffice" in FIG. 2(b) collapse into a single row labeled sem 2.

The index for syntactically related words is usually much larger than the index for semantically related words because of several reasons. A large number of words on the Web are proper names and are not be found in a dictionary. According to a study by the present inventors on parsing 2,904 documents, only 42% of keywords can be found in WordNet, which has more than 60,000 words. See G. A. Miller. ""Nouns in WordNet: A Lexical Inheritance System" In International Journal of Lexicography 3 (4), 1990, pages 245–264. The other 58% of words include proper names and typographical errors, which have contributed to the large size of the indices. In the traditional IR systems, the syntactic association is generally captured through co-occurrence relationship. Since word co-occurrences in the same document are one to one relationships, if there are n words identified, the worst case for the index size is $$\frac{n \times (n-1)}{2}$$

associations. It is too expensive to index co-occurring words of more than two due to enormous storage and indexing overhead.

Let the words found in a dictionary be denoted as S (semantically meaningful) and all other words be denoted as P (proper names). Based on the above classification of dictionary and non-dictionary words, the co-occurrence relationship between words can be classified into three different categories:

P-P form such as (Toyota, Avalon), (Acura, Legend), (Nissan, Maxima).

S-P or P-S forms such as (Buick, car), (Buick, dealer), (car, Ford), (Ford, auto), and (Ford, dealer).

S-S form such as (car, garage) and (auto, garage).

Generally, it will be difficult to convert the entries in FIG. 3(b) of the form P—P to a coarser granularity. All other entries, however, have an S word which can be replaced by its corresponding higher level semantic concept. This will result in a reduction in the size of co-occurrence index and will speed-up query processing.

Figure 4C:
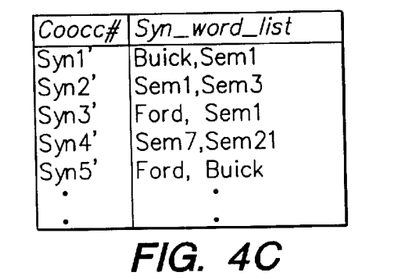

The reduction in index size occurs as follows. For each entry in S-P form, $(w_1, X)$, such that $w_l$ corresponds to a semantic concept $Sem_l$, replace all such $(w_1, X)$ entries of FIG. 3(b) by $(Sem_l, X)$ in FIG. 4(c). The corresponding document lists are also merged. A similar procedure is followed for the entries in the P-S form. As shown in FIGS. 4(c), entries (Ford, car) and (Ford, auto) are replaced by (Ford, Sem1). Similarly, entries (Ford, dealer) and (Ford, showroom) are replaced by (Ford, Sem2). This merge mechanism is illustrated in FIGS. 5(a) and 5(b).

Figure 5A:
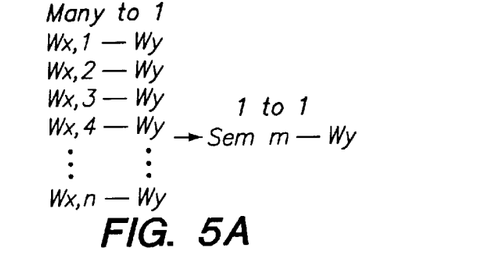
FIG. 5 illustrates the merging of co-occurring word index entries.
Figure 5B:
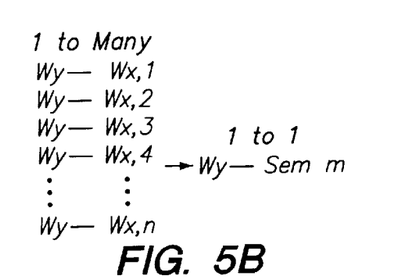

Entries in S-S form can be merged in two ways:

Simple merge: 1-to-many/many-to-1 types of merge as shown in FIGS. 5(a) and (b). For example, entries (car, dealer), (automobile, dealer), and (auto, dealer) are replaced by (Sem1, dealer). The algorithm used here is the same as that for S-P and P-S form.

Figure 5C:
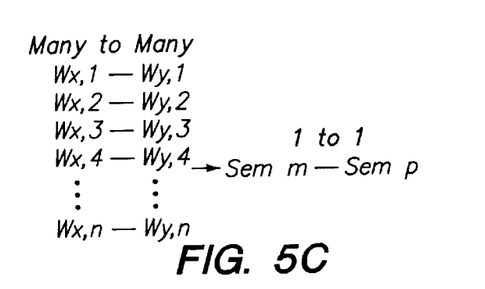

Complex merge: Many to many types of merge as shown in FIG. 5(c). An example is to represent entries (car, dealer), (automobile, showroom), and (auto, SalesOffice) as (Sem1, Sem2). The algorithm for this type of merge is as follows:

1. For each entry in S-S form, $(w_i, X)$ such that $w_l$ corresponds to a semantic concept $Sem_i$, replace all such $(w_i, X)$ entries of FIG. 3(b) by $(Sem_i, X)$ in FIG. 4(c).

2. For each entry of type $(Sem_i, w_j)$ such that $w_j$ corresponds to a semantic concept $Sem_j$, replace all such $(Sem_i, w_j)$ by $(Sem_i, Sem_j)$.

Note that step 2 may be performed before step 1. Additionally, steps 1 and 2 of the algorithm may be iteratively performed until no further merges are possible.

When multiple entries are merged, the respective syn__ doc__list for each of the entries is also merged accordingly by a union operation.

The multi-granularity indexing scheme may be implemented on top of an OODBMS. In such an implementation, the tables in FIGS. 2(a), 3(a) and 4(c) are classes with contents. The other tables are classes with only pointers. Update, delete, and insert operations on indices may be carried out by the OODBMS through automatic view maintenance or programs to propagate among classes. The maintenance of multi-granularity indices is done incrementally; reorganization is not required.

Next, an example estimate will be calculated regarding the additional storage overhead that is needed to support index-tables based on semantic concepts, in accordance with the present invention, in addition to the traditional word-based indices. As discussed in the previous section, the tables of FIG. 4 have been introduced for efficient query processing. Initially, the storage estimate for the indices used in a traditional IR system, i.e., the tables shown in FIG. 2, will be calculated. Assume that the number of documents in the given collection is D. Furthermore, assume that the number of distinct dictionary words (after removing stopwords and grouping words by using word-stemming) in the given document collection is W and the number of non-dictionary words be V. Let the average number of dictionary words per document be w, non-dictionary w, words be v and the average number documents per word be d. The index sizes in terms of number of entries (i.e., number of rows) as well as in terms of the total size (i.e., number of pointers) of the table is computed. Note that each entity in the table is represented as a pointer data-type. Given these parameters, the size of table in FIG. 2(a) is:

$$\text{Number Of Rows}[2(a)] = D \quad (1)$$

$$\text{TotalSize}[2(a)] = (1+v+w)D \quad (2)$$

Note that the term 1+v+w arises because in each row one pointer is needed for the document identifier, on the average v pointers are needed to represent non-dictionary words in the word list and, on average, w pointers are needed for dictionary words in the word list. Similarly, the size of the table in FIG. 2(b) is given as:

$$\text{Number Of Rows}[2(b)] = W+V \quad (3)$$

$$\text{TotalSize}[2(b)] = (1+d) \cdot (W+V) \quad (4)$$

Each row in this table needs, on average, d pointers for the document identifiers in the document list and one pointer for the word itself.

Next, the storage overhead of the on-line dictionary and the syntactic co-occurrence table that are needed to support basic query expansion is estimated. Let f be the compression factor that is obtained by grouping dictionary words into semantic concepts. Thus, f can be viewed as the average number of words grouped by a concept. The table size in FIG. 3(a) is:

$$\text{Number Of Rows}[3(a)] = W/f \quad (5)$$

$$\text{TotalSize}[3(a)] = W+W/f \quad (6)$$

Equation (5) arises since the dictionary word space shrinks by the compression factor f, whereas in Equation (6), W pointers are needed to represent the words in the word list and W/f pointers are needed to represent the semantic identifiers. The term q represents the average number of entries in the document list per co-occurrence term. The worst case size in the table in FIG. 3(b) is given by the following expressions:

$$\text{Number Of Rows}[3(b)] = V(V-1)/2 + VW + W(W-1)/2 \quad (7)$$

$$\text{TotalSize}[3(b)] = (1+2+q) \cdot (V(V-1)/2 + VW + W(W-1)/2) \quad (8)$$

In Equation (7) the first term corresponds to the word co-occurrences of the form P—P, the second to S-P or P-S, and the last corresponds to the co-occurrences of the form S—S. The term q represents the average number of entries in the document list per co-occurrence term. In addition three pointers are needed to represent the syntactic term identifier and the two words involved in a co-occurrence relationship in each row.

Next, the storage overhead of multi-granularity indexing in accordance with the present invention, which groups semantically similar set of terms into a unique semantic concept, is estimated. As before, in order to compute the sizes of index tables in FIG. 4 the average number of documents per semantic concept and the average number of semantic concepts per document need to be estimated. Since multiple terms reduce to a semantic concept, the average number of documents per semantic concept will be larger than d and it can be argued that this expansion will be no larger than f·d. On the other hand, the average number of concepts per documents cannot become larger than w. In fact, it can be argued that this number will be comparable to w. Based on these parameters, the additional storage overhead of multi-granularity indexing can be computed. The computation for the table in FIG. 4(a) is:

$$\text{Number Of Rows}[4(a)] = D \quad (9)$$

$$\text{TotalSize}[4(a)] = (1+v+w)D \quad (10)$$

That is, the size remains the same as that in FIG. 2(a). On the other hand the size of the table in FIG. 4(b) is:

$$\text{Number Of Rows}[4(b)] = W/f \quad (11)$$

$$\text{TotalSize}[4(b)] = (1+df) \cdot W/f \quad (12)$$

The number of dictionary word entries reduce by a factor of f due to the words collapsing into semantic concept. However, the number of documents per semantic concept increases by approximately the same factor. As a result the size of this table remains comparable to the table in FIG. 2(b). Note that the tables in FIGS. 4(a) and (b) are the two tables of FIGS. 2 (a) and (b), respectively, at a higher level of granularity. Finally, the estimated storage of the table of FIG. 4(c) is computed:

$$\text{Number Of Rows}[3(b)] = V(V-1)/2 + V \cdot \frac{W}{f} + \frac{W(W-1)}{2f^2} \quad (13)$$

$$\text{TotalSize}[3(b)] = (1+2+q) \cdot V(V-1)/2 + \quad (14)$$
$$(1+2+qf) \cdot V \cdot \frac{W}{f} + (1+2+qf) \frac{W(W-1)}{2f^2}$$

Basically, all the co-occurrence terms involving the S form are compressed by a factor of f and result in substantial savings in this table when compared to that in FIG. 3(b).

Finally, in accordance with the present invention, all of the tables except FIG. 3(b) are required. On the other hand, the rudimentary query expansion scheme will need tables in FIGS. 2 and 3. Thus, although the storage cost in the present scheme increases due the tables 4(a) and 4(b) it is partially compensated due to the reduced size of table 4(c). The exact savings will depend on the various values of the parameters discussed above. In the worst case the extra storage will be significantly less than twice that in the rudimentary query expansion scheme.

The indexing scheme presented above has been discussed with the assumption that a word has only a single sense. However, words generally have multiple senses. For example, the word bank can be interpreted as a financial institution or as a riverbank. To consider words with multiple senses, a word in the Sem_word_list (shown in FIG. 3) may belong to multiple Concept# in FIG. 4(a). For example, bank may be associated with Sem10 and Sem20. To perform query expansion with consideration of multiple senses, when a query contains a word which is located in multiple Concept#, each of the different Concept# should be taken into account during query processing.

In the above discussion, the indexing scheme has been implemented on top of NEC OODBMS, and the words in Sem_word_list are associated with Concept# through pointers. No redundant data is stored and storage costs for pointers are very low. Since WordNet can provide synonyms for a word in different sense interpretations ranked by how often such senses are used (e.g. bank is interpreted as a financial institution more often than being interpreted as a river bank), the most popular sense interpretation is used in the current implementation. However, the data structure is extendible.

Semantic groupings other than what has been presented above may also be taken into consideration. In FIG. 4, only query expansion by synonym is considered. Other forms of semantic relaxation may also be considered, such as ISA, IS_PART_OF, etc. Multiple tables of the form shown in FIG. 4(a) can be created for various semantic groupings (for example, one for ISA and one for IS_PART_OF). Alternatively, a single table can be used for the various semantic groupings. To perform query expansion by both synonyms and hypernyms, look ups may be made to multiple tables.

In order to deal with the problem of word mismatch, a query processing scheme needs to expand the query words with relevant words. As a result, an additional task for ranking the documents by their relevance to the original query words may be performed. Next, query processing with expansion will be presented as three tasks in accordance with the present invention: query expansion, query processing, and result ranking.

Figure 6:
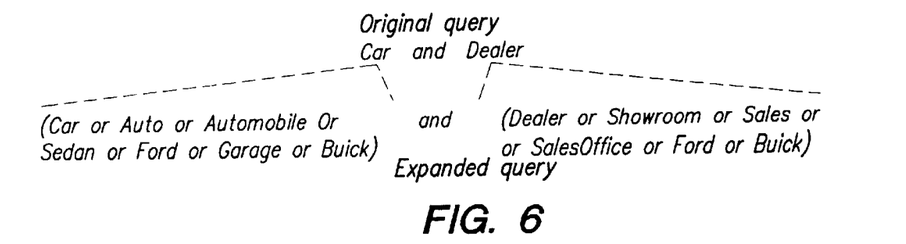
FIG. 6 illustrates query expansion processing in a traditional information retrieval system.
Figure 7:
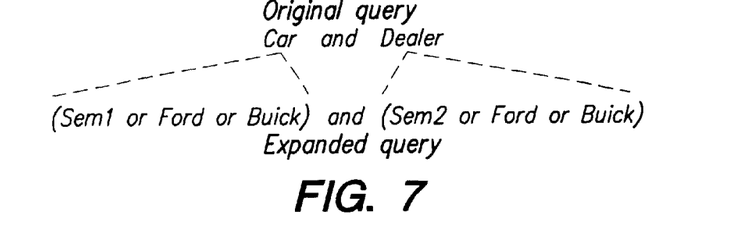
FIG. 7 illustrates query expansion processing using the multi-granularity query expansion scheme of the present invention.

First, query expansion will be discussed. FIG. 6 shows an example of query expansion under a prior query expansion scheme. A query "retrieve documents containing the words car and dealer" is rewritten as shown by adding additional words relevant to car and dealer. The relevant words of semantic similarity and syntactic co-occurrence relationship are determined from tables in FIG. 3. An example of a query under the multi-granularity query expansion scheme of the present invention is shown in FIG. 7. Multi-granularity query expansion transforms the words car and dealer into the concepts Sem1 and Sem2 by using the table in FIG. 3(a). After translating the words into their corresponding higher level semantic concept, the table in FIG. 4(c) is used to expand the semantic concepts to include syntactic relationship as well as the proper names in the original query are expanded to include relevant words from the co-occurrence table.

Given a query Q involving both dictionary and non-dictionary words, the query Q can be represented as:

$$Q = (s_1 \wedge \ldots \wedge s_m) \wedge (p_1 \wedge \ldots \wedge p_n)$$

In this equation, $s_i$, represents a dictionary word and $p_j$ represents a non-dictionary word. Furthermore, there are m dictionary words and n non-dictionary words in the query Q. Given such a query, the multi-granularity query expansion is performed as follows:

1. For each $s_i$=1, . . . ,m, replace $s_i$, in Q with its corresponding higher level semantic concept from the table in FIG. 3(a). Each such concept will be denoted as $C_i$.
2. For each $C_i$, i=1 , . . . , m, obtained from step 1, expand Q by including syntactically related words to $C_i$ by using the table in FIG. 4(c). The entries of the form S—S will contribute additional concepts and those of the form S-P will contribute proper names.
3. For each $p_j$, j=1, . . . , n, expand Q by including syntactically related words by co-occurrence to $p_j$ by using the table in FIG. 4(c). The entries of the form P-S will contribute additional concepts and those of the form P—P will contribute additional proper names.
4. Remove redundant query words or concepts in Q.

Compared with a query expanded with the traditional scheme, an expanded query in accordance with the present invention is more compact with fewer conditions to check since the query words are converted to entities at a coarser granularity. As a result, the query processing for the expanded query in accordance with the present invention is less expensive. Next, the number of entities (words or concepts) introduced in the query expansion of prior schemes as well as in the multi-granularity query expansion scheme of the present invention will be estimated. Recall that the average number of dictionary words grouped under a higher level semantic concept is denoted by f. Let g be the average number of semantically related higher level concepts to a word and let h be the average number of syntactically related proper names related to a word. Then the number of words in Q under basic query expansion (BQ) is the total expansion that occurs in steps 1, 2, and 3:

$$\text{Count}[BQ] = (mf) + m(g+h) + n(g+h)$$

where the first term arises since each of the m dictionary words is replaced by f semantically similar words. The second term arises since each of the m dictionary words has additional g+h co-occurrences of dictionary and non-dictionary types. This third term corresponds to each of n proper names adding g+h co-occurrences. Similarly, the number of words and concepts in Q under the multi-granularity query expansion (MGQ) is as follows:

$$\text{Count}[MGQ] = m + m(g/f+h) + n(g/f+h)$$

Essentially, the main distinction is that the compression factor f arises since we are using the higher level semantic representation of the set of similar words is being used. Thus, the number of words/concepts involved in the query under multi-granularity query expansion is strictly smaller than that in basic query expansion. If the number of proper names per word is small in the table of FIG. 4(c), then the query complexity in the present expansion scheme reduces by a factor of f.

Turning now to query processing, in traditional query processing, based on exact matching, the search process can be terminated as soon as it can be determined that search predicate associated with the query cannot be satisfied. This is not the case in IR since the search is based on similarity. In particular, the user may want to see results with partial matches to their search criterion. Therefore, for a query with N words, N lookups are needed which are independent of the boolean conditions in the search predicate. Furthermore, since partial match is supported, an additional ranking phase is needed after query processing. The ranking scheme requires information on which words in the documents match the query and the word frequency in the documents.

Now the lookup costs associated with processing a query under the two schemes will be analyzed. Note that the basic difference in the processing cost will arise due to two factors:

The number of words in the basic query expansion is larger than that in the multi-granularity query expansion, and The number of entries in the respective tables over which the lookup will be performed is different under the two schemes.

Now the lookup costs for the query Q considered above will be estimated. Assuming that the tables are organized in the form of a balanced search structures, the operation of table lookup will be logarithmic in the number of rows in the table. Hence, by using the estimates developed in Section 3, the lookup cost of executing Q under basic query expansion is:

$$LookupCost(Q, BQ) = mf \cdot \log(Number\ Of\ Rows[2(b)]) +$$
$$(m+n) \cdot (g+h) \cdot \log(Number\ Of\ Rows[3(b)])$$
$$= mf \cdot \log(W+V) +$$
$$(m+n) \cdot (g+h) \cdot \log(V(V-1)/2 + VW +$$
$$W(W-1)/2)$$

Similarly, the lookup cost of executing Q under multi-granularity expansion will be:

$$LookupCost(Q, MGQ) = m \cdot \log(Number\ Of\ Rows[4(b)]) +$$
$$(m+n) \cdot (g/f+h) \cdot$$
$$\log(Number\ Of\ Rows[4(c)])$$
$$= m \cdot \log(W/f+V) + (m+n) \cdot (g/f+h) \cdot$$
$$\log\left(V(V-1)/2 + V \cdot \frac{W}{f} + \frac{W(W-1)}{2f^2}\right)$$

Since the number of dictionary word lookups are reduced by a factor of f in MGQ and the sizes of both tables on which the lookup is performed is smaller in MGQ, it is clear that the query processing cost under MGQ is lower than that in BQ.

Turning now to the ranking scheme of the present invention, in the query processing phase, word representations at a coarser granularity are used for filtering out unrelated documents. However, the candidate documents have the same ranking since they all satisfy both conditions, car and dealer at a coarser granularity level. This is not a desired property for query processing results. Therefore, in the ranking phase, the original words in the candidate documents are accessed and are used for ranking.

Figure 8:
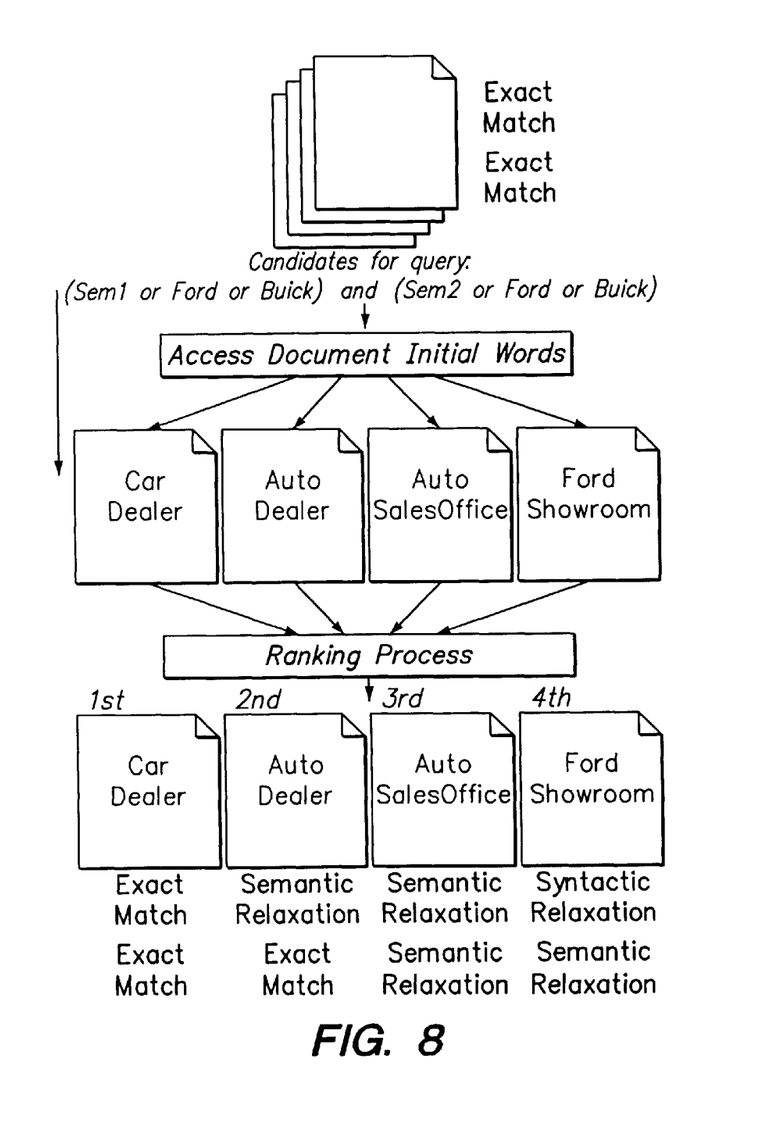
FIG. 8 illustrates the ranking process in accordance with the present invention.

In FIG. 8, four candidate documents are shown with keywords satisfying the condition:

(Sem1 V Ford V Buick)Λ(Sem2 V Ford V Buick)

Their initial matching keywords are retrieved for ranking. Thus, (car, dealer), (auto, dealer), (auto, sales office), and (Ford, showroom) are used to rank their degrees of relevance.

The candidates are ranked based the degrees of relaxation in matching words in the document with words in the query. In one example, the degrees of relaxation may be defined in the order of E<Se<Sy<X, (i.e. Exact Match<Semantic Relaxation<Syntactic Relaxation<Do Not Match), where a word with a higher degree of query relaxation with respect to the query word means that the query results with such a word are less relevant to the user. However, the order and definition of degrees of relaxation can be arbitrary as applications require. The less relaxation that was used to find the matching candidate the higher the candidate document is ranked. On the bottom of FIG. 8, the document with the words car and dealer is given the highest rank since the candidate words match the query words exactly. The document with words "auto" and "dealer" has the second highest rank since only one word requires semantic relaxation (i.e. replacing query terms with semantically related terms) to be matched with the query word car. Other ranking is carried out similarly in FIG. 8.

The ranking scheme is based on the following two principles:

For a given query keyword, Q, if the relationship between Q and the keywords Word1, Word2, Word3 and Word4 in Doc1, Doc2, Doc3 and Doc4 respectively are: exactly match, match through semantically query relaxation, match through syntactically query relaxation and do not match, the documents are ranked as follows: Doc1>Doc2>Doc3>Doc4.

Figure 9:
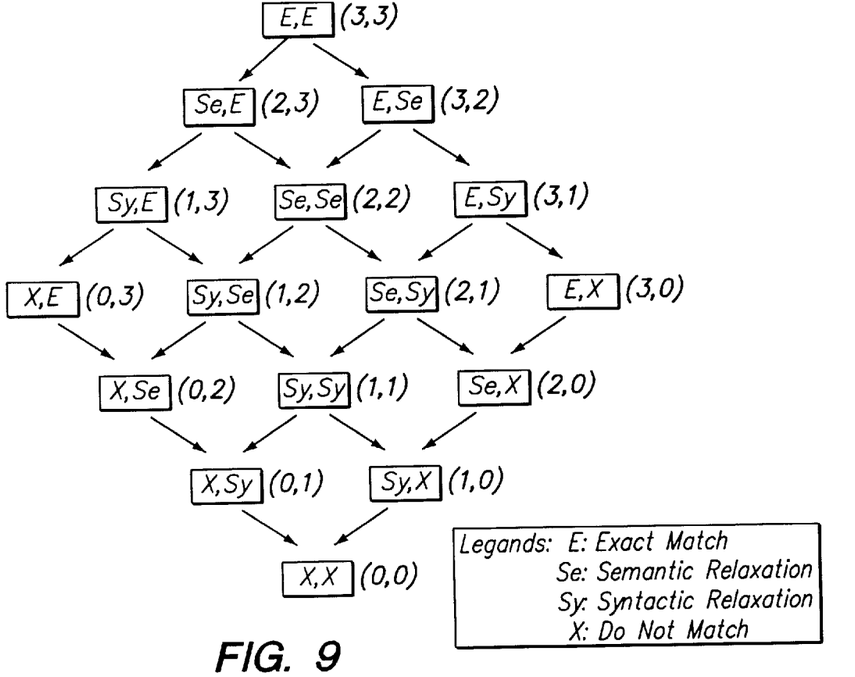
FIG. 9 illustrates a two dimensional ranking graph for a query having two words.

The ranking (scores) for M documents, $Doc_i$, i ... M, with $Match_i$, i ... M keywords matching the query respectively are as follows: $Doc_1 > Doc_2 > Doc_3$ ... $Doc_{M-1} > DOC_M$ if $Match_1 > Match_2 > Match_3$ ... $Match_{M-1} > Match_M$ Based on the above ranking scheme using a query with two keyword terms, a two-dimensional ranking graph can be generated for the documents for a query with two words as shown in FIG. 9. Without query expansion, only documents in the slot (E, E) are retrieved. With both semantically and syntactical query expansion, all relevant documents are retrieved unless the documents are in the slot (X, X).

The ranking graph is represented as a matrix. For a query with N terms the ranking graph is represented by a N by 4 matrix: M(i, j), i =0 ... N and j=0 ... 3. For example, the ranking graph in FIG. 9 is represented as a matrix, M(i, j), i=0 ... 2 and j=0 ... 3. The slots (E, E), (Se, E), (Se, Sy), and (X, X), for example, are represented as slots (3,3), (2,3), (2,1), and (0,0), respectively, in the matrix. With this representation, the documents can be easily ranked as follows:

For the documents in the slot (n, m), where m is between 0 and 3, the ranking of these documents scores are higher than the documents in slots (i, j), where i=0 ... n and j=0 ... 3.

The ranking score for the documents in the slots (n 1, m 1) is higher than or equal to the documents in the slots (n2, m2) if n1≧n2 and m1≧m2.

The presentation of the ranking graph is carried out by available visualization tools. For example, a visualization method, called Cone Trees, can be modified by adding the depth for 3 dimensional ranking graph presentation. See G. G. Robertson et. al., "Information Visualization Using 3D Interactive Animation"Communications of the ACM, Vol. 36, No. 4, pages 57–71, April, 1993.

Figure 10:
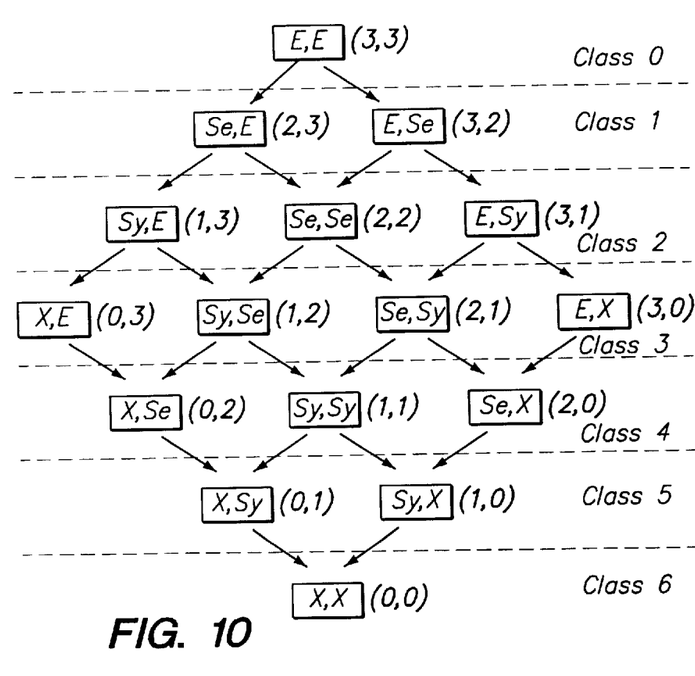
FIG. 10 illustrates a sequence for progressive query processing.

Based on this ranking scheme, the results in the slot at the top of FIG. 9 have higher ranking scores than the results at the bottom. However, it is difficult to rank the results in slots at the same class in FIG. 9. FIG. 10 shows how such a ranking may be accomplished. The result slots are further classified into classes, where results in slots in the same class have the same ranking.

With the class structure of FIG. 10, query processing, in accordance with the present invention, can be performed progressively by class. Take the example where a user issues a query with two keywords and requests that the top 50 results be retrieved. Referring to FIG. 10, the query processor can initially produce the results in class 0. If the number of results is greater than 50, the query processor can stop without performing the query expansion task. If the number of results in class 0 is less than 50, the query processor can then produce the results in class 1 (e.g. slots (2,3) and (3,2)). If the total number of results (e.g. in class 0 and class 1) is greater than 50, the query processor can stop without performing further query processing. Note that the query processor can produce the results in slots (2,3) and (3,2) successively as well. That is to say, the query processor can first produce the results in slot (2,3) first. If the total number of results is greater than 50, the query processor can stop without producing the results in slot (3,2). The query processor can continue producing additional results from the remaining slots and classes as described, until the total number of results is greater than 50, or until the last class is reached.

Figure 11:
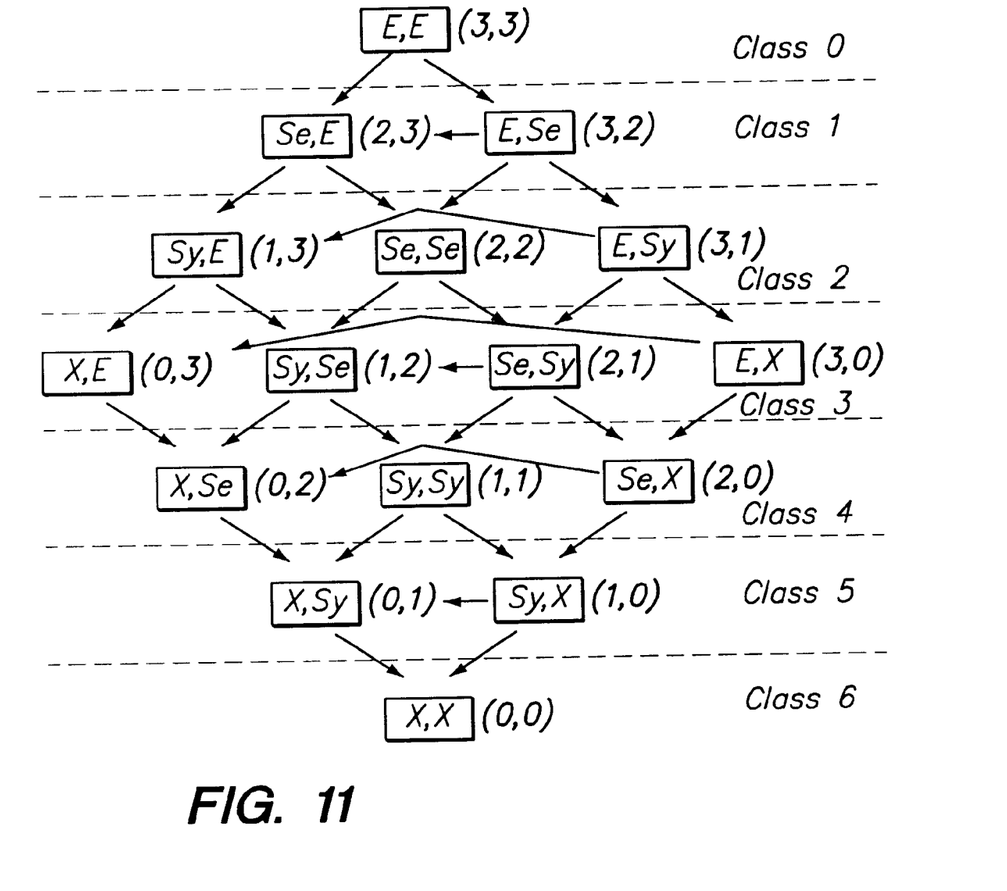
FIG. 11 illustrates a sequence for progressive query processing where a keyword may be assigned a level of importances.

If the above example is modified so that the user specifies that one keyword is more important than the other, the order in which the query processor retrieves slots of results can be modified accordingly. For example, if the user specifies that keyword 1 is more important than keyword 2, a horizontal query processing order within classes can be derived, as shown in FIG. 11. Then, in the example, the query processor would produce the results in slot (3,2) first. Then, if the total number of results was less than 50, then the query processor would subsequent produce the results in slot (2,3).

Figure 12:
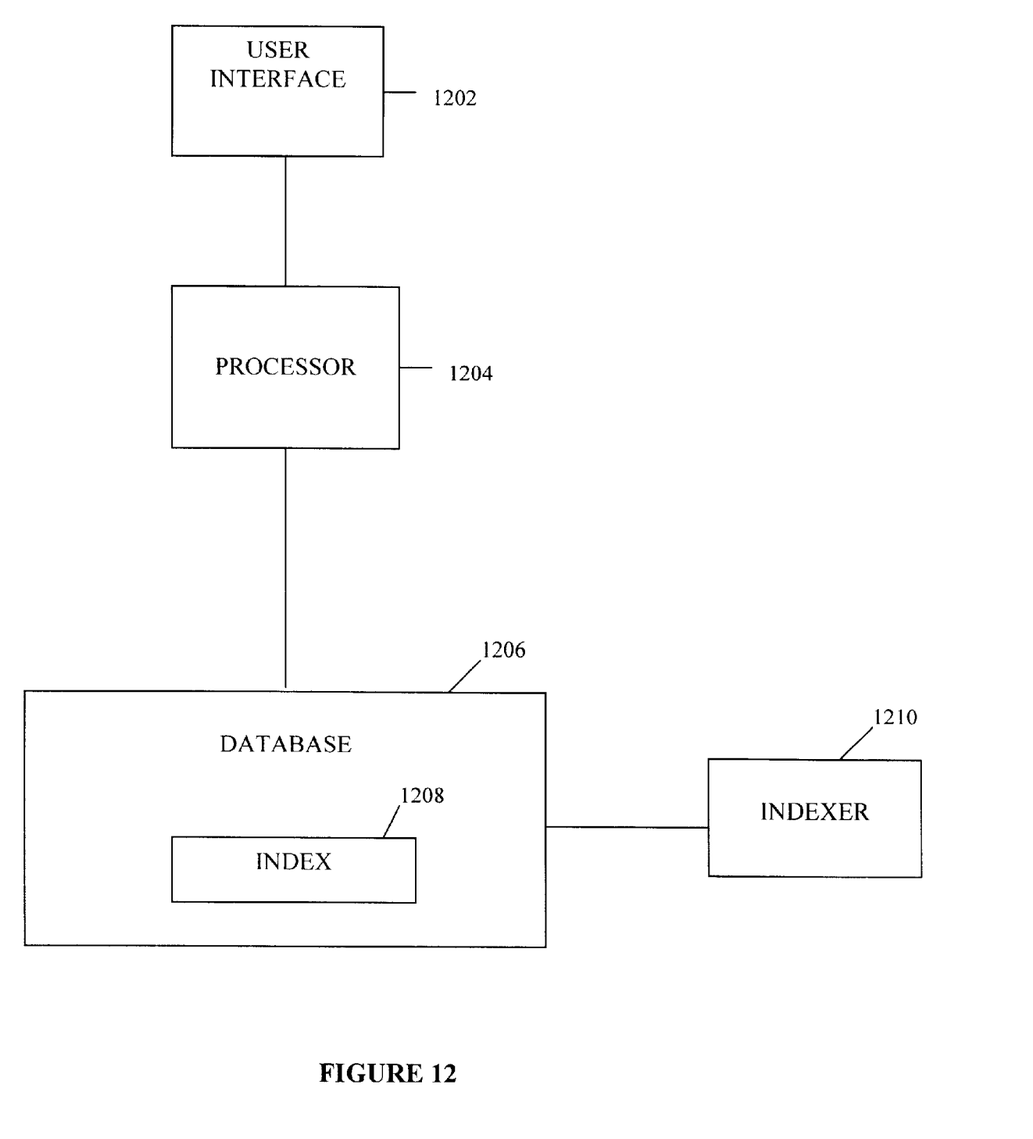
FIG. 12 illustrates a physical embodiment which may be used to implement the present invention.

FIG. 12 shows a physical implementation of a system upon which the present invention may be practiced. Such a system includes a database 1206 for storing a collection of documents. The database may include an index 1208 for storing concepts (e.g. semantical or syntactical concepts) and their relationships to the documents in the collection. The system may further include an indexer 1210 for creating the index 1208 and for also creating an index 1208 containing higher level granularity concepts and their relationships to the documents in the collection. A processor 1204 may be used to accept queries presented by a user through the user interface 1202. The processor 1204 then processes the query and performs ranking function. The results of the query and ranking function are presented back to the user through the user interface 1202.

Those skilled in the art will recognize that the exemplary environment illustrated in FIG. 12 is not intended to limit the present invention. Indeed, those skilled in the art will recognize that other alternative hardware environments may be used without departing from the scope of the invention. For example, the various functions described above may be performed by separate elements (e.g. the query processing and ranking functions may be performed by different components) or may be performed by a single element (e.g. a single processor may perform the indexing, query processing and ranking functions).

In summary, the present invention presents a novel technique for supporting query expansion efficiently using a multi-granularity indexing (saving index space) and query processing (saving processing time) schemes while the original effectiveness (i.e. precision and recall) of a given input set of document keywords, lexical semantics dictionary, and queries is preserved.

The multi-granularity indexing and query processing scheme in accordance with the present invention allows for smaller size indices for word associations, faster query processing time since queries are simplified, and consistent ranking results since the ranking technique in accordance with the present invention is based on initial words in documents.

Other modifications and variations to the invention will be apparent to those skilled in the art from the foregoing disclosure and teachings. Thus, while only certain embodiments of the invention have been specifically described herein, it will be apparent that numerous modifications may be made thereto without departing from the spirit and scope of the invention.

What is claimed is:

1. A method of querying a database of documents, the database including a preliminary index of the documents, words contained in the documents and associations therebetween, the words in the preliminary index being of an original granularity, the method comprising the steps of:
   a) replacing the words in the preliminary index with corresponding higher granularity concepts, resulting in a coarser granularity index of reduced index size;
   b) logically expanding a query applied to the database of documents by replacing only the words of the query, being of the original granularity, meeting a predetermined criterion, which is whether the words can be found in a lexical dictionary with corresponding ones of the higher granularity concepts,
   b)(i) wherein the higher granularity concepts are higher granularity semantic concepts,
   b)(ii) further logically expanding the query by adding syntactically related words for each of the corresponding ones of the higher granularity concepts;
   b)(iii) further logically expanding the query by adding syntactically related words for each of the words in the query failing to meet the predetermined criterion;
   b)(iv) replacing ones of the syntactically related words meeting the predetermined criterion with associated ones of the higher granularity concepts; and
   b)(v) removing any redundant ones of the syntactically related words and higher granularity concepts from the expanded query;
   c) executing the logically expanded query to retrieve ones of the documents associated, through the coarser granularity index, with the corresponding ones of the higher granularity concepts; and
   d) retrieving ones of the documents in order of relevance until a predetermined number of ones of the documents associated with the corresponding ones of the higher granularity concepts are retrieved, wherein the order of relevance is an exact match, a semantic match, a syntactical match and no match between the words of the query and the words contained in the retrieved ones of the documents.

2. The method according to claim 1, wherein in the replacing step, the higher granularity concepts are higher granularity semantic concepts.

3. The method according to claim 2, wherein the higher granularity semantic concepts each contain synonyms.

4. The method according to claim 1, wherein in the replacing step, only ones of the words in the preliminary index meeting a predetermined criterion are replaced by the corresponding higher granularity concepts.

5. The method according to claim 4, wherein the predetermined criterion is whether the words can be found in a lexical dictionary.

6. The method according to claim 1, wherein in the replacing step, the higher granularity concepts are higher granularity syntactical concepts.

7. The method according to claim 6, wherein the higher granularity syntactical concepts each contain words co-occurring in ones of the documents above a threshold level of frequency.

8. The method according to claim 1, wherein in the replacing step, ones of the words in the preliminary index having multiple meanings are replaced by multiple ones of the corresponding higher granularity concepts.

9. The method according to claim 1, wherein words failing to meet the predetermined criterion are proper nouns.

10. The method according to claim 1, wherein the step of executing progresses in successive stages until a predetermined number of the ones of the documents associated with the corresponding ones of the higher granularity concepts are retrieved.

11. The method according to claim 10, wherein each of the stages represents a class of expansion.

12. The method according to claim 10, wherein each of the stages represents a slot within a class of expansion.

13. The method according to claim 10, wherein within each of the stages, the ones of the documents are retrieved in an order reflecting a level of importance assigned to at least one of the words of the query.

14. A method querying a database of documents, the database including an index of reduces index size of the documents, higher granularity concepts and associations therebetween, the higher granularity concepts corresponding to words of original granularity contained in the documents, the method comprising the steps of:
- a) logically expanding a query applied to the database of documents by replacing only words of the query, being of the original granularity, meeting a predetermined criterion, which is whether the words can be found in a lexical dictionary, with corresponding ones of the higher granularity concepts,
  - a)(i) wherein the higher granularity concepts are higher granularity semantic concepts,
  - a)(ii) further logically expanding the query by adding syntactically related words for each of the corresponding ones of the higher granularity concepts;
  - a)(iii) further logically expanding the query by adding syntactically related words for each of the words in the query failing to meet the predetermined criterion;
  - a)(iv) replacing ones of the syntactically related words meeting the predetermined criterion with associated ones of the higher granularity concepts; and
  - a)(v) removing any redundant ones of the syntactically related words and higher granularity concepts from the expanded query;
- b) executing the logically expanded query to retrieve documents associated, through the index, with the corresponding ones of the higher granularity concepts; and
- c) retrieving ones of the documents associated with the corresponding ones of the higher granularity concepts are retrieved, wherein the retrieved ones of the documents are ranked using the words of the query, being of the original granularity, 15. The method according to claim 14, wherein the higher granularity semantic concepts each contain synonyms.

16. The method according to claim 14, wherein the higher granularity concepts are higher granularity syntactical concepts.

17. The method according to claim 16, wherein the higher granularity syntactical concepts each contain words co-occurring in ones of the documents above a threshold level of frequency.

18. The method according to claim 14, wherein the words failing to meet the predetermined criterion are proper nouns.

19. The method according to claim 14, where the syntactically related words are words co-occurring in one of the documents above a threshold level of frequency.

20. The method according to claim 14, wherein the order of relevance is an exact match, a semantic match, a syntactical match and no match between the words of the query and words in the retrieved ones of the documents.

21. The method according to claim 14, wherein ones of the words of original granularity contained in the documents correspond to multiple ones of the higher granularity concepts.

22. The method according to claim 14, wherein the step of executing progresses in successive stages until a predetermined number of the ones of the documents associated with the corresponding ones of the higher granularity concepts are retrieved.

23. The method according to claim 22, wherein each of the stages represents a class of expansion.

24. The method according to claim 22, wherein each of the stages represents a slot within a class of expansion.

25. The method according to claim 22, wherein within each of the stages, the ones of the documents are retrieved in an order reflecting a level of importance assigned to at least one of the words of the query.

26. A system for querying a database of documents, the database including a preliminary index of the documents, words contained in the documents and associations therebetween, the words in the preliminary index being of an original granularity, the system comprising:
- a) an indexer for replacing the words in the preliminary index with corresponding higher granularity concepts, resulting in a coarser granularity index of reduced index size;
- b) a user interface for providing a query to be applied to the database of documents; and
- c) a processor for logically expanding the query by replacing only the words of the query, being of the original granularity, meeting a predetermined criterion, which is whether the words can be found in a lexical dictionary, with corresponding ones of the higher granularity concepts, whereupon the processor executes the logically expanded query to retrieve ones of the documents associated, through the coarser granularity index, with the corresponding ones of the higher granularity concepts, wherein the processor retrieves ones of the documents in order of relevance until a predetermined number of ones of the documents associated with the corresponding ones of the higher granularity concepts are retrieved, using the words of the query, being of the original granularity, and wherein the order of relevance is an exact match, a semantic match, a syntactical match and no match between the words of the query and the words contained in the retrieved ones of the documents,
  - c)(i) wherein the higher granularity concepts are higher granularity semantic concepts, and wherein logically expanding the query further comprises;
  - c)(ii) adding syntactically related words for each of the corresponding ones of the higher granularity concepts;
  - c)(iii) adding syntactically related words for each of the words in the query failing to meet the predetermined criterion;
  - c)(iv) replacing ones of the syntactically related words meeting the predetermined criterion with associated ones of the higher granularity concepts; and
  - c)(v) removing any redundant ones of the syntactically related words and higher granularity concepts from the expanded query.

27. The system according to claim 26, wherein the higher granularity concepts are higher granularity semantic concepts.

28. The system according to claim 27, wherein the higher granularity semantic concepts each contain synonyms.

29. The system according to claim 26, wherein in the indexer replaces only ones of the words in the preliminary index meeting a predetermined criterion by the corresponding higher granularity concepts.

30. The system according to claim 29, wherein the predetermined criterion is whether the words can be found in a lexical dictionary.

31. The system according to claim 26, wherein the higher granularity concepts are higher granularity syntactical concepts.

32. The system according to claim 31, wherein the higher granularity syntactical concepts each contain words co-occurring in ones of the documents above a threshold level of frequency.

33. The system according to claim 26, wherein ones of the words in the preliminary index having multiple meanings are replaced by multiple ones of the corresponding higher granularity concepts.

34. The system according to claim 26, wherein words failing to meet the predetermined criterion are proper nouns.

35. The system according to claim 26, wherein the execution of the query progresses in successive stages until a predetermined number of the ones of the documents associated with the corresponding ones of the higher granularity concepts are retrieved.

36. The method according to claim 35, wherein each of the stages represents a class of expansion.

37. The method according to claim 35, wherein each of the stages represents a slot within a class of expansion.

38. The system according to claim 35, wherein within each of the stages, the ones of the documents are retrieved in an order reflecting a level of importance assigned to at least one of the words of the query.

39. A system of querying a database of documents, the database including an index of reduced index size of the documents, higher granularity concepts and associations there between, the higher granularity concepts corresponding to words of original granularity contained in the documents, the system comprising:
   a) a user interface for providing a query to be applied to the database of documents; and
   b) a processor for logically expanding the query replacing only words of the query meeting a predetermined criterion, which is whether the words can be found in a lexical dictionary, being of the original granularity, with corresponding ones of the higher granularity concepts, whereupon the processor executes the logically expanded query to retrieve documents associated, throughout the index, with the corresponding ones of the higher granularity concepts,
   b)(i) wherein the higher granularity concepts are higher granularity semantic concepts, and wherein the processor logically expands the query by further;
   b)(ii) adding syntactically related words for each of the corresponding ones of the higher granularity concepts;
   b)(iii) adding syntactically related words for each of the words in the query failing to meet the predetermined criterion;
   b)(iv) replacing ones of the syntactically related words meeting the predetermined criterion with associated ones of the higher granularity concepts; and
   b)(v) removing any redundant ones of the syntactically related words and higher granularity concepts from the expanded query, wherein the processor further retrieves ones of the documents in order of relevance until a predetermined number of ones of the documents associated with the corresponding ones of the higher granularity concepts are retrieved.

40. The system according to claim 39, wherein the higher granularity semantic concepts each contain synonyms.

41. The system according to claim 39, the higher granularity concepts are higher granularity syntactical concepts.

42. The system according to claim 41, wherein the higher granularity syntactical concepts each contain words co-occurring in ones of the documents above a threshold level of frequency.

43. The system according to claim 39, wherein the words failing to meet the predetermined criterion are proper nouns.

44. The system according to claim 39, where the syntactically related words are words co-occurring in one of the documents above a threshold level of frequency.

45. The system according to claim 39, wherein the order of relevance is an exact match, a semantic match, a syntactical match and no match between the words of the query and words in the retrieved ones of the documents.

46. The system according to claim 39, wherein ones of the words of original granularity contained in the documents correspond to multiple ones of the higher granularity concepts.

47. The system according to claim 39, wherein the execution of the query progresses in successive stages until a predetermined number of the ones of the documents associated with the corresponding ones of the higher granularity concepts are retrieved.

48. The method according to claim 47, wherein each of the stages represents a class of expansion.

49. The method according to claim 47, wherein each of the stages represents a slot within a class of expansion.

50. The system according to claim 47, wherein within each of the stages, the ones of the documents are retrieved in an order reflecting a level of importance assigned to at least one of the words of the query.

* * * * *

UNITED STATES PATENT AND TRADEMARK OFFICE
CERTIFICATE OF CORRECTION

PATENT NO.    : 6,480,843 B2
DATED         : November 12, 2002
INVENTOR(S)   : Wen-Syan Li It is certified that error appears in the above-identified patent and that said Letters Patent is hereby corrected as shown below:

Column 6,
Line 22, delete "TR" and insert -- IR --;
Line 42, after "dealer" ", insert -- , --; after "showroom" ", insert -- , --;
Line 43, after " room" ", insert -- . --;
Line 45, after " "automobile" ", insert -- ) --;
Line 66, after " mobile" ", insert -- , --.

Column 8,
Line 13, delete "$w_1$", insert -- $w_i$ -- (both occurrences);
Line 14, delete "$Sem_1$", insert -- $Sem_i$ --; and delete "$w_1$", insert -- $w_i$ --;
Line 15, delete "$Sem_1$", insert -- $Sem_i$ --;
Line 33, delete "$w_1$", insert -- $w_i$ --.

Column 9,
Line 2, after "non-dictionary", delete "w,".

Column 14,
Line 37, after "Animation" ", insert -- , --.

Column 17,
Line 30, after "documents", insert -- in order of relevance until a predetermined number of ones of the documents --.
Line 34, after "granularity", delete "," and insert -- . --.

Signed and Sealed this

Fourth Day of March, 2003

JAMES E. ROGAN
*Director of the United States Patent and Trademark Office*